United States Patent [19]
Ofstein

[11] Patent Number: 4,999,254
[45] Date of Patent: Mar. 12, 1991

[54] INCREASED REGRIND USE IN COEXTRUDED STRUCTURES

[75] Inventor: David E. Ofstein, Williamsburg, Va.

[73] Assignee: Rampart Packaging Inc., Williamsburg, Va.

[21] Appl. No.: 586,848

[22] Filed: Sep. 21, 1990

Related U.S. Application Data

[62] Division of Ser. No. 444,572, Nov. 30, 1989, which is a division of Ser. No. 149,279, Jan. 28, 1988, Pat. No. 4,894,291.

[51] Int. Cl.$^5$ .............................................. B32B 27/09
[52] U.S. Cl. ................................. 428/518; 428/517; 428/516; 428/903.3; 156/244.11
[58] Field of Search ............ 428/517, 518, 516, 903.3; 156/244.11

[56] References Cited

U.S. PATENT DOCUMENTS

| | | | |
|---|---|---|---|
| 4,605,576 | 8/1986 | Jabarin | 428/35 |
| 4,629,596 | 12/1986 | Coffman | 264/171 |
| 4,705,708 | 11/1987 | Briggs et al. | 428/35 |
| 4,781,954 | 11/1988 | Krishnakumar et al. | 428/35 |

OTHER PUBLICATIONS

"Multiphase Flow in Polymer Processing", by Chang Dae Han, published in 1981 by the Academic Press.
"Coextrusion: New Layers of Technology", by Ed Galli, published in PM&E in Jan. 1988.
"Coextrusion with Barrier Scrap-Problems and Solutions", by Dragon Djordjevic, presented at the Soc. of Plastics Eng. on 10/5-7/87.

*Primary Examiner*—Edith Buffalow
*Attorney, Agent, or Firm*—Donald F. Haas

[57] ABSTRACT

A laminate, a method for making the laminate and articles formed from the laminate are disclosed. The laminate comprises an outer layer, an optional adhesive layer, an inner layer, an intermediate regrind layer formed of a blend of the materials from which the other layers are formed, and, interposed between the outer layer and the intermediate regrind layer, there is a buffer layer which is formed from a blend of the materials from which the outer layer and the intermediate regrind layer are formed and which comprises at least about 5% of the material of the intermediate regrind layer. The outer layer is preferably polypropylene and the inner layer is preferably an ethylene vinyl alcohol copolymer.

17 Claims, 3 Drawing Sheets

STANDARD STRUCTURE

BUFFER STRUCTURE

STANDARD STRUCTURE

BUFFER STRUCTURE

STANDARD STRUCTURE

BUFFER STRUCTURE

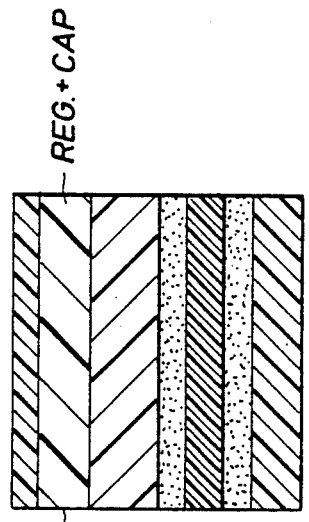
FIG. 2A
STANDARD STRUCTURE
CAP — REGRIND — ADHESIVE — EVOH — ADHESIVE — CAP
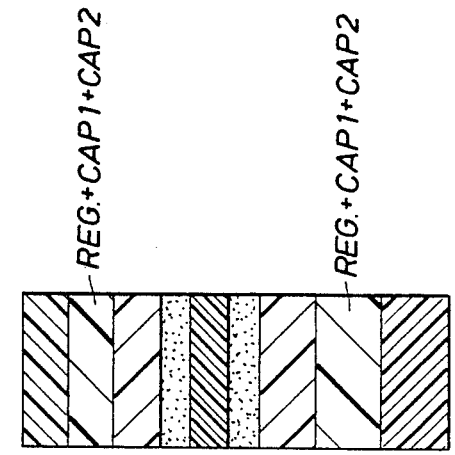
FIG. 2B
BUFFER STRUCTURE
BUFFER — REG.+CAP
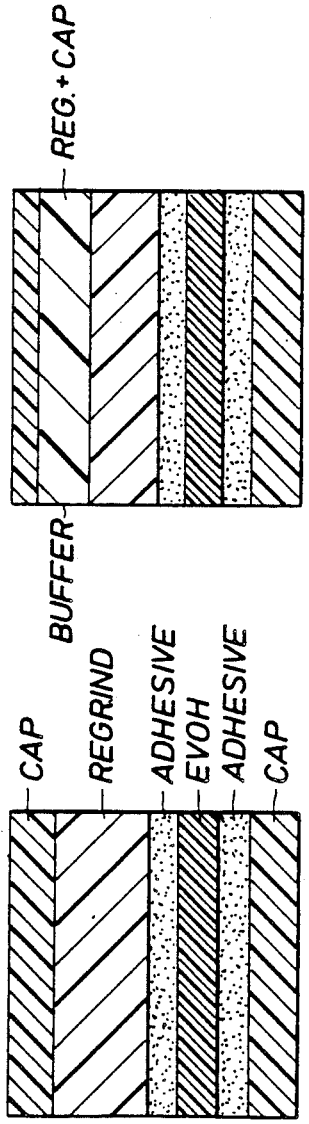
FIG. 2C
STANDARD STRUCTURE
CAP 1 — REGRIND — ADHESIVE — EVOH — ADHESIVE — REGRIND — CAP 2
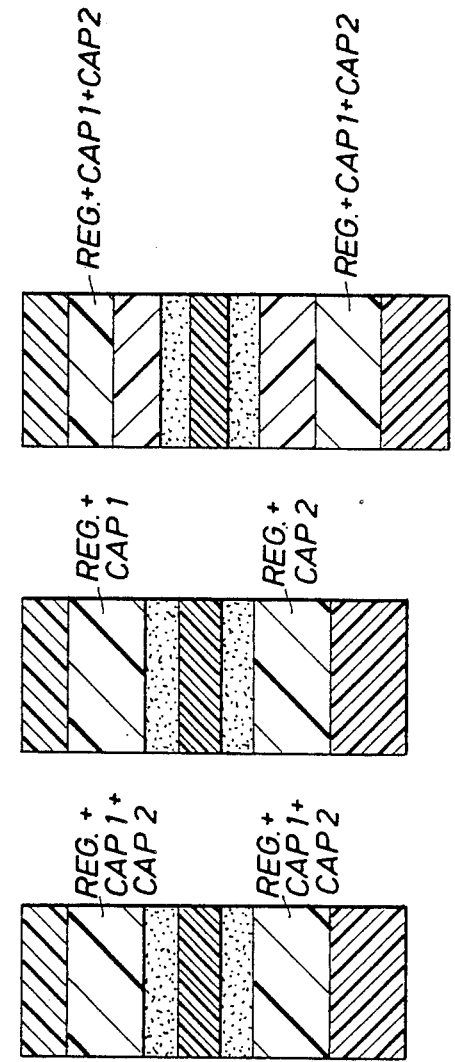
FIG. 2D or FIG. 2E or FIG. 2F  ETC....
BUFFER STRUCTURE
FIG. 2D: REG.+CAP1+CAP2, REG.+CAP1+CAP2
FIG. 2E: REG.+CAP1, REG.+CAP2
FIG. 2F: REG.+CAP1+CAP2, REG.+CAP1+CAP2

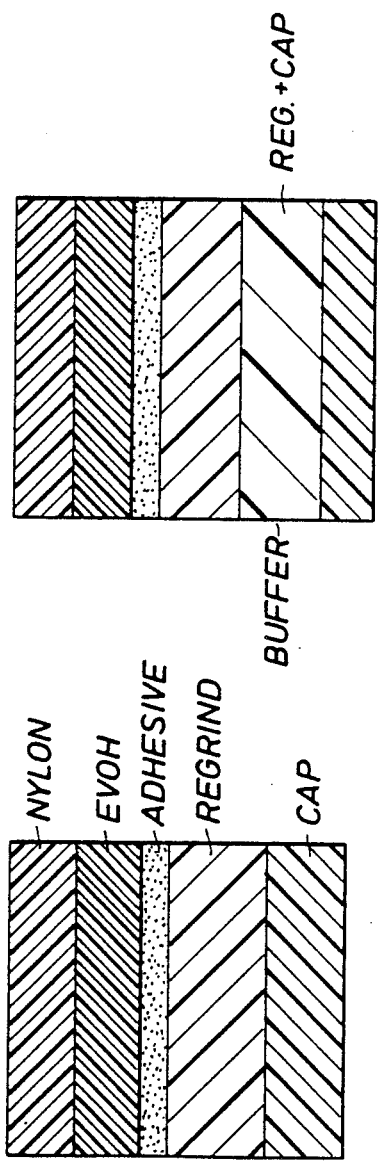
FIG.2G
STANDARD STRUCTURE
NYLON
EVOH
ADHESIVE
REGRIND
CAP
FIG.2H
BUFFER STRUCTURE
BUFFER
REG.+CAP
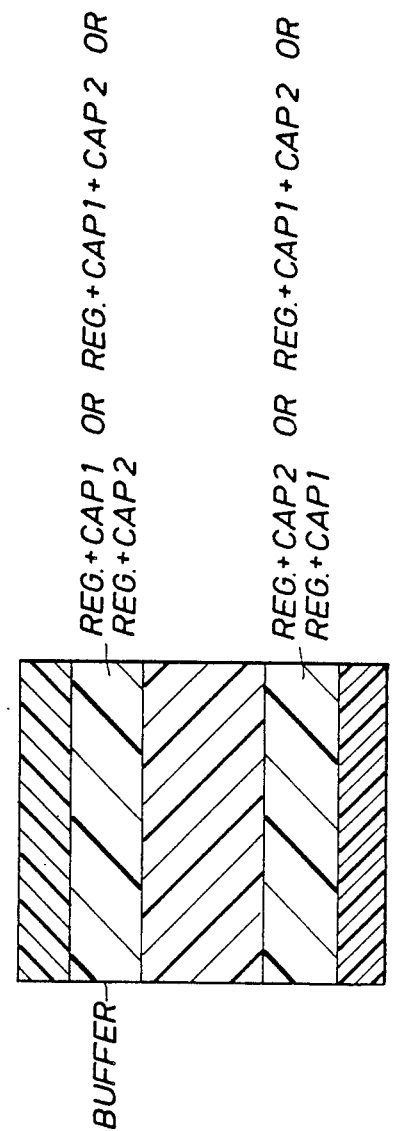
FIG.2J
STANDARD STRUCTURE
CAP 1
REGRIND
CAP 2
FIG.2K
BUFFER STRUCTURE
BUFFER
REG.+CAP1 OR REG.+CAP1+CAP2 OR REG.+CAP2
REG.+CAP2 OR REG.+CAP1+CAP2 OR REG.+CAP1

INCREASED REGRIND USE IN COEXTRUDED STRUCTURES

This is a division of application Ser. No. 444,572 filed Nov. 30, 1989 which is a division of Ser. No. 149,279 filed Jan. 28, 1988. Now U.S. Pat. No. 4,894,291,

BACKGROUND

Field of the Invention

The present invention relates to a method for increasing the amount of regrind which can be incorporated into a laminate formed of at least two different thermoplastic materials having different rheological properties. The invention also relates to a laminate made by such a method.

In particular, this invention provides for a method and a laminate which is formed by coextrusion of one or more layers of barrier material such as any of the ethylene vinyl alcohol copolymers, one or more layers of adhesive, two outer protective layers of materials such as polypropylene or another polyolefin such as high density polyethylene, low density polyethylene and copolymers of polypropylene and polyethylene or polystyrene and layers of a regrind material which is a blend of the materials of all of the layers. More particularly, this invention refers to formation of articles such as plastic cups thermoformed from sheets made by coextrusion of the above-mentioned layers of materials in such a way in combination so that delamination of the regrind layers or turbulence at the layer interfaces does not occur.

Background of the Invention

Coextruded structures containing two or more different layers are becoming more commonplace, especially in the food packaging industry. Multilayer plastic structures are displacing many materials, such as glass and metal containers, due to cost and performance factors. One route frequently used in the production of plastic containers is thermoforming from coextruded sheet. A typical structure will have an oxygen barrier layer to extend shelf life, outer or cap layers for moisture, taste and/or odor barrier purposes, and adhesive layers to bond the barrier layer to the outer layers. This type of production method can easily result in scrap levels of more than 50%. Since some of the materials are very expensive and the scrap material, or regrind as it is often called, can only be sold for a fraction of the cost of the original materials, as much of the regrind as possible is reused in the structure in order to make these plastic containers cost competitive with glass and metal containers. This regrind is typically used as an intermediate layer between the outer protective layer and the barrier layer and typically displaces a portion of the material of the outer protective layer. The regrind layer can be used symmetrically about a center layer (typically the barrier material) or on one side denoted as an asymmetric structure.

Heretofore, extruded plastic, especially multilayer polyolefin based, sheets have been subject to problems of delamination or separation within the regrind layers and/or turbulence, ripples or discontinuities between the layers. The problem is related to the physical properties of the regrind which is also related to its composition. Typical, for example, is regrind which contains polypropylene, ethylene vinyl alcohol copolymers (EVOH) and adhesive, examples of which are shown in FIGS. 1 and 2. The level of these components in the regrind is dependent on the loading of the individual components in the sheet structure. It is also dependent on the amount of regrind recycled; that is, as more regrind is recycled by displacing the polypropylene outer layers, the higher the level of EVOH and adhesive in the regrind. Such typical regrind has materials of different viscosities which can cause the problems stated above and detailed in the following paragraphs.

Delamination causes (a) unsightly defects where it is obvious that the sheet delaminated, (b) loss of part stiffness and (c) loss of impact resistance. Delamination can occur when materials of different viscosities and compatibility are not sufficiently mixed and/or the incompatible component(s) is present in too high concentration to be dispersed into fine enough domains. At high shear rates, the higher viscosity materials tend to move toward the center of the layer. In ethylene vinyl alcohol copolymer (EVOH) films, this is believed to be due to a phase separation of the incompatible polar EVOH and the non-polar polyolefins in the high shear field inside the extruders, feedblock and/or die. In many cases, as with the use of EVOH, delamination in the coextruded material layers normally occurs during forming; delamination can also occur during flexing while in use before the desired lifetime of the product has expired.

Turbulence, which is a descriptive term rather than related to the classical definition of turbulent flow, can be caused by several factors in sheet coextrusion: moisture in the raw materials, irregular flow surfaces in the feedblock and die, or materials properties of the various components. Under normal processing conditions and with standard tooling, only the latter case, material properties, i.e., the mismatch in properties, is of any consequence. This type of turbulence seems to be related to the difference in viscoelastic properties between the outer cap layer(s) and inner, regrind layer(s).

The scrap material or regrind is generally formed into sheet by regrinding it, melting it and re-extruding it. The structure wherein a regrind layer is interposed between an outer layer and an inner layer suffers from the disadvantage that as more regrind is used in the laminate, the tendency towards turbulence and/or delamination is increased. As more regrind is added to the structure displacing the outer layer, a critical shear stress is reached at which point the interface between the two layers becomes unstable resulting in turbulence. The instability caused by this turbulence causes poor sheet quality and containers formed from this sheet are unacceptable in appearance and, when used with barrier materials, the barrier protection can be adversely affected, increasing oxygen permeability by as much as 10 times. The point at which the interface becomes unstable and turbulence occurs is dependent on the magnitude of the difference between the outer cap layer and the inner regrind layer, i.e., on the type of materials used. A case in point follows.

Viscosity data for polypropylene (nominal 2 MF) used as the cap layers, and two different regrinds generated from a barrier sheet containing a maleic anhydride-modified polypropylene adhesive and a 5.5 MF (@190° C.) EVOH is shown in Table 1 below.

TABLE 1

| Shear Rate (1/sec) | PP (2 MF) | Viscosity (poise @ 200° C.) | | PP (5 MF) |
| --- | --- | --- | --- | --- |
| | | Regrind A | Regrind B | |
| 20 | 21,500 | 13,500 | 13,000 | 15,000 |
| 100 | 8,400 | 5,500 | 5,000 | 5,700 |
| 800 | 1,600 | 1,550 | 1,300 | 1,500 |
| 2,000 | 1,100 | 750 | 700 | 750 |

The adhesive and EVOH in the regrind cause it to have a significantly different viscosity than the polypropylene outer layers. At the same loading and processing conditions, the sheet structure utilizing Regrind A had no turbulence while the sheet containing Regrind B did show some rippling or discontinuous waves (i.e., turbulence). To determine if turbulence was truly a viscoelastic affect and not some type of anomaly associated with the regrind, the regrind layer was substituted with a polypropylene with similar viscosity to the regrind. A critical shear stress was reached at which point the interface became unstable.

As stated above, turbulence seems to be a viscoelastic dependent problem which increases as the amount of regrind used increases. Since from a cost standpoint it is desirable to use more regrind, there is a need for a method which allows the incorporation of a maximum amount of regrind but which prevents the onset of turbulence which leads to the problems discussed above and possibly also to delamination.

The present invention provides a method for making a laminate which can be used to make articles which include a greater amount of regrind material than was possible before but which also avoid the turbulence problems which would make the articles undesirable for use in most applications. This is accomplished by incorporating between the outer layer and the regrind layer a buffer layer which is formed of a blend of regrind material and the material of the outer layer.

SUMMARY OF THE INVENTION

The present invention relates to a method for increasing the amount of regrind which may be incorporated into a laminate, the laminate made by such a method and an article formed from such a laminate. The basic laminate is comprised of at least one outer layer, optional adhesive layers, at least one inner layer and, in most cases, at least one intermediate regrind layer formed of a blend of the materials from which the other layers are formed. The method for increasing the amount of regrind which may be incorporated into such a laminate comprises interposing between the outer layer and the intermediate regrind layer, a buffer layer which is formed from a blend of the materials from which the outer layer and the intermediate regrind layer are formed and which comprises at least about 5% to about 100% of the material from which the intermediate regrind layer is formed. The laminate of the present invention is then the basic laminate described above with the buffer layer interposed between the outer layer and the intermediate regrind layer. An alternate, although less effective, approach is to replace the regrind layer with the buffer layer where the buffer layer could comprise a larger portion of the sheet composition by displacing some of the outer cap layer. This would be an option when an extruder is not available to add the extra buffer layer. Such laminates may then be used to form articles which are also within the scope of the invention.

BRIEF DESCRIPTION OF THE DRAWINGS

Examples of various symmetric (i.e., sheet composition symmetrical about a centerline) are shown in FIG. 1 wherein the lefthand side shows the old unimproved structure and the righthand side shows the parallel structure of the present invention.

FIG. 2 shows examples of various asymmetric unimproved and parallel improved structures which also fall within the scope of my invention.

DETAILED DESCRIPTION OF THE INVENTION

Figure 1A:
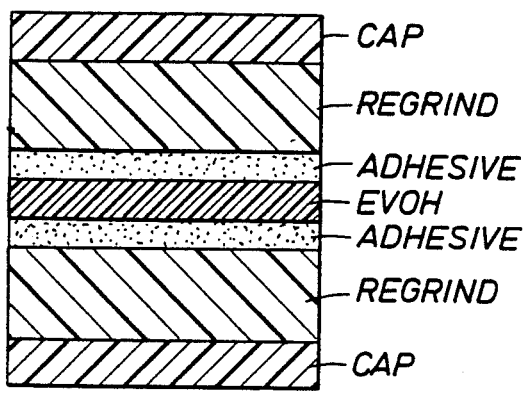

The outer layer and the inner layer are comprised of materials which have sufficiently different rheological properties such that turbulence and/or delamination is a significant problem when the two are used in a laminate, with or without an adhesive. Many different combinations of materials can be used. In barrier applications, the outer layer becomes a protective outer layer and the inner layer becomes an inner barrier layer.

The purpose of the protective outer layer is typically to serve as a barrier to moisture and as a functional barrier to prevent migration of components from other layers into the package. This layer also usually provides much of the structural integrity for the article which is formed from the laminate made according to the present invention. The protective outer layer is formed of a plastic material, preferably a polyolefin, and most preferably, polypropylene, although polyethylene, copolymers of propylene and ethylene, polystyrene, polyester terepthalate, styrene-maleic anhydride (SMA), nylon, polycarbonate, polyvinyl chloride (PVC), etc. may also be used.

The purpose of the barrier material is to prevent the passage of oxygen through the laminate in order to, for example, keep food packed within fresh. There are a number of oxygen-barrier materials which may be used including nylon, polyvinylidene chloride (PVDC) and polyester terepthalate (PET), but the preferred materials are ethylene vinyl alcohol copolymers. Ethylene vinyl alcohol copolymers have excellent oxygen barrier properties and have the additional advantage of good processability.

The adhesive layer, if necessary, may be formed of any adhesive which will bond the protective outer layer to the barrier layer. When polypropylene and ethylene vinyl alcohol copolymers are used, it is preferred that the adhesive be a maleic anhydride-modified polypropylene adhesive because such adhesives are known to provide good bonding between the polypropylene and the EVOH.

The intermediate regrind layer is formed by taking the scrap material from the sheet or web which was formed of the inner and outer (and, optionally, the adhesive) layers, regrinding the scrap material to form the regrind material, melting the regrind and then reextruding it into a layer which is interposed between the outer layer and the inner layer in the final basic laminate.

As stated above, it is generally desirable to incorporate as much regrind as possible into the laminate because this allows use of less of the virgin outer layer materials, so that the regrind does not have to be sold at a low value or disposed of, thus minimizing the cost of producing this type of container. However, prior to this invention, as the amount of regrind used in the laminate was increased, the tendency for turbulence to form in the laminate was also increased which, as discussed above, is not acceptable if articles are to be formed from the laminate.

It has been found that the total amount of regrind which can be used in a barrier laminate can be increased from about 40% up to at least 60% by the use of a buffer layer which is formed of a blend of the material of the protective outer layer, i.e. polypropylene, and the materials of the intermediate regrind layer, i.e. polypropylene, adhesive and EVOH. This buffer layer is interposed between the protective outer layer and the intermediate regrind layer in order to span the differences in the rheological properties between the two layers. The same relative results will be achieved in non-barrier laminates. It has been found that the buffer layer is preferably comprised of at about 25% to about 100%, most preferably from about 50% to about 75%, of the material from which the intermediate regrind layer is formed to achieve the optimum incorporation of regrind into the laminate structure.

An alternate approach has also been found effective. Turbulence can be eliminated by replacing the regrind layer(s) with a buffer-type layer(s) with the same composition as described above. This option is less effective in increasing overall regrind usage as compared to the method described above. However, this approach can be used if an extruder is not available to add the extra buffer layer to the existing sheet structure.

EXAMPLE 1

Figure 1B:
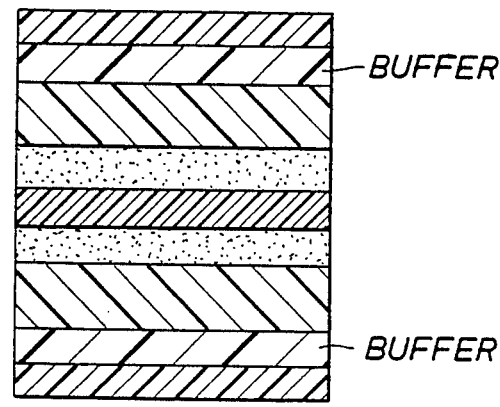
Figure 1C:
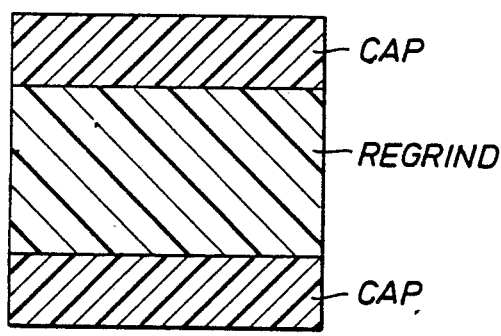
Figure 1D:
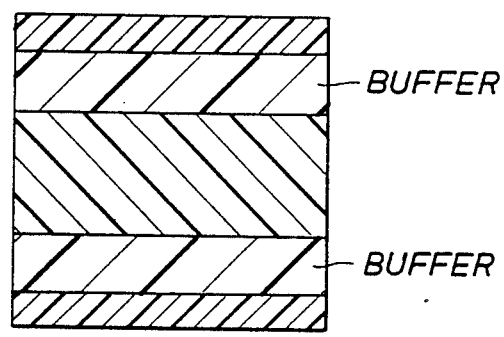
Figure 1E:
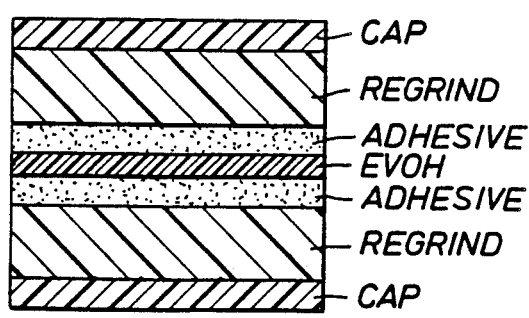
Figure 1F:
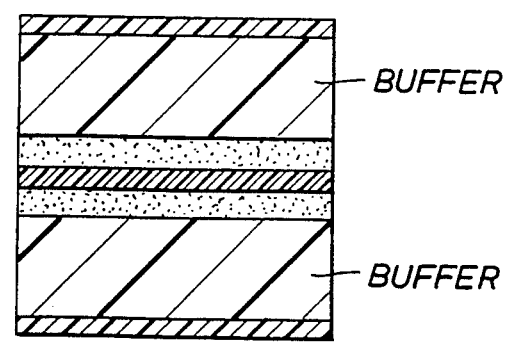

A series of nine layer barrier laminates as shown in Example B of FIG. 1 were coextruded and evaluated for the onset of turbulence. The nine layer structure comprised cap layer/buffer layer/regrind/adhesive/barrier/adhesive/regrind/buffer layer/cap layer. In all cases, the cap layer was polypropylene homopolymer having a nominal melt flow rate of 2.0 g/10 min. at 230° C., 2.16 kg. The EVOH was EVAL® E105 made by Kuraray and having a nominal melt flow rate of 5.5 g/10 min. at 190° C., 2.16 kg. The adhesive was a maleic anhydride-modified polypropylene. The regrind was a mixture of the foregoing three materials. The buffer layer was a blend of regrind and cap layer, polypropylene homopolymer. Five structures were made with varying amounts of regrind in the buffer layer as shown in Table 2.

TABLE 2

| Buffer Layer % Regrind | Total Regrind Utilization (%) |
| --- | --- |
| no buffer layer | 40.0 |
| 0 | 47.9 |
| 25 | 55.5 |
| 50 | 61.5 |
| 75 | 62.9 |
| 100 | 57.9 |

In the above experiments, the cap, buffer and regrind layers were varied to allow maximum regrind utilization by increasing the amount of regrind until turbulence was observed during coextrusion. It can be seen from the above table that when the percent regrind in the buffer layer was at least about 25%, the total regrind utilization was over 55% which is a great improvement over the 40% maximum which was possible without the use of a buffer layer as described in the present invention. An incorporation of over 60% was achieved when the percent regrind was 50% and 75%.

EXAMPLE 2

While producing a seven-layer coextruded barrier structure using the same type of materials denoted in Example 1 and illustrated in Example E in FIG. 1, turbulence was encountered at a nominal regrind loading of 40%. This particular occurrence was thought to be caused by varying regrind quality which can be related to moisture content and/or previous heat history (i.e., the number of passes through the system). Several cases were tested to eliminate turbulence using this regrind by replacing the regrind layer with a blend of polypropylene and regrind; this structure is illustrated in Example F of FIG. 1. The results are shown in Table 3.

TABLE 3

| Buffer Layer (% Regrind) | Total Regrind Utilization (%) |
| --- | --- |
| No buffer layer (100% regrind) | 26 (very minor turbulence) |
| 88 | 35 (patchy minor turbulence) |
| 80 | 32 (no turbulence) |

The regrind usage was increased from 26 to 32% producing better quality sheet.

I claim:

1. A laminate for use in oxygen barrier applications which comprises:
   (a) a protective outer layer which is comprised of polystyrene;
   (b) an adhesive layer;
   (c) an inner barrier layer comprised of a material selected from the group consisting of ethylene vinyl alcohol copolymers and polyvinylidene chloride;
   (d) interposed between layers (a) and (b), an intermediate regrind layer formed of a blend of the materials from which (a), (b) and (c) are formed; and
   (e) interposed between layers (a) and (d), a buffer layer which is formed from a blend of the materials from which layers (a) and (d) are formed and which comprises from about 5% to about 100% of the material of layer (d).

2. The laminate of claim 1 wherein the buffer layer comprises from about 25% to about 100% of the material of layer (d).

3. The laminate of claim 2 wherein the buffer layer comprises from about 50% to about 75% of the material of the intermediate regrind layer.

4. An article which is formed from the laminate of claim 1.

5. A method for increasing the amount of regrind which may be incorporated into a laminate comprised of an outer protective layer which is comprised of polystyrene, an adhesive layer, a barrier layer which is selected from the group consisting of ethylene vinyl alcohol copolymers and polyvinylidene chloride, an intermediate regrind layer which is formed of a blend of the materials from which the outer protective, adhesive and barrier layers are formed, which comprises interposing between the outer protective layer and the intermediate regrind layer, a buffer layer which is formed from a blend of the materials from which the outer protective and intermediate regrind layers are formed and which comprises from about 5% to about 100% of the materials from which the intermediate regrind layer is formed.

6. The method of claim 5 wherein the buffer layer comprises from about 25% to about 100% of the material of the intermediate regrind layer.

7. The method of claim 6 wherein the buffer layer comprises from about 50% to about 75% of the material of the intermediate regrind layer.

8. The method of claim 5 wherein the laminate is formed into an article.

9. A laminate for use in oxygen barrier applications which comprises:
(a) a protective outer layer which is comprised of polystyrene;
(b) an adhesive layer;
(c) an inner barrier layer comprised of a material selected from the group consisting of ethylene vinyl alcohol copolymers and polyvinylidene chloride;
(d) interposed between layers (a) and (b), an intermediate regrind layer formed of a blend of the materials from which (a), (b) and (c) are formed; and
(e) interposed between layers (a) and (d), a buffer layer which is formed from a blend of the materials from which layers (a) and (d) are formed and which comprises from about 5% to about 75% of the material of layer (d).

10. The laminate of claim 9 wherein the buffer layer comprises from about 25% to about 75% of the regrind blend.

11. The laminate of claim 10 wherein the buffer layer comprises from about 50% to about 75% of the material of the regrind blend.

12. An article which is formed from the laminate of claim 9.

13. A method for increasing the amount of regrind which may be incorporated into a laminate comprised of an outer protective layer which is comprised of polystyrene, an adhesive layer, a barrier layer which is selected from the group consisting of ethylene vinyl alcohol copolymers and polyvinylidene chloride, which comprises interposing between the outer protective layer and the adhesive layer, a buffer layer which is formed from a blend of the materials of the outer protective and a regrind blend of the materials of the inner, outer and adhesive layers wherein the regrind blend comprises from about 5% to about 75% of the buffer layer.

14. The method of claim 13 wherein the buffer layer comprises from about 25% to about 100% of the material of the regrind blend.

15. The method of claim 14 wherein the buffer layer comprises from about 50% to about 75% of the material of the regrind blend.

16. The method of claim 13 wherein the laminate is formed into an article.

17. The article formed by the method of claim 16.

* * * * *